May 14, 1940.　　　　V. A. HOOVER　　　　2,200,776

FLAT CABLE CONSTRUCTION

Filed Dec. 8, 1937

INVENTOR
Vaino A. Hoover
By Lyon & Lyon ATTORNEYS

Patented May 14, 1940

2,200,776

UNITED STATES PATENT OFFICE 2,200,776

FLAT CABLE CONSTRUCTION

Vaino A. Hoover, Los Angeles, Calif., assignor to Byron Jackson Co., Huntington Park, Calif., a corporation of Delaware Application December 8, 1937, Serial No. 178,740

1 Claim. (Cl. 173—244)

This invention relates to insulated electrical conductors and particularly to multiple-conductor cables especially adapted for use with submersible motorpump units in which the motor is located below the pump.

In such units the pump is frequently of only slightly smaller diameter than the well casing, making it impossible to extend a round conductor cable of the size required by the motor past the pump to the motor. A clearance of only ¾" to 1" between the pump and the well casing is not uncommon, whereas a round conductor cable for a three-phase motor of a size adapted to such use is from 2" to 2½" in diameter. It is therefore necessary to provide a special form of cable for at least that portion which extends past the pump.

A principal object of this invention is to provide a flat multiple-conductor cable.

A further object of the invention is to provide a flat conductor cable of minimum thickness and of sufficient flexibility to permit bending where this becomes necessary.

A still further object of the present invention lies in the provision of a novel method of constructing a flat multiple-conductor cable.

Figure 1:
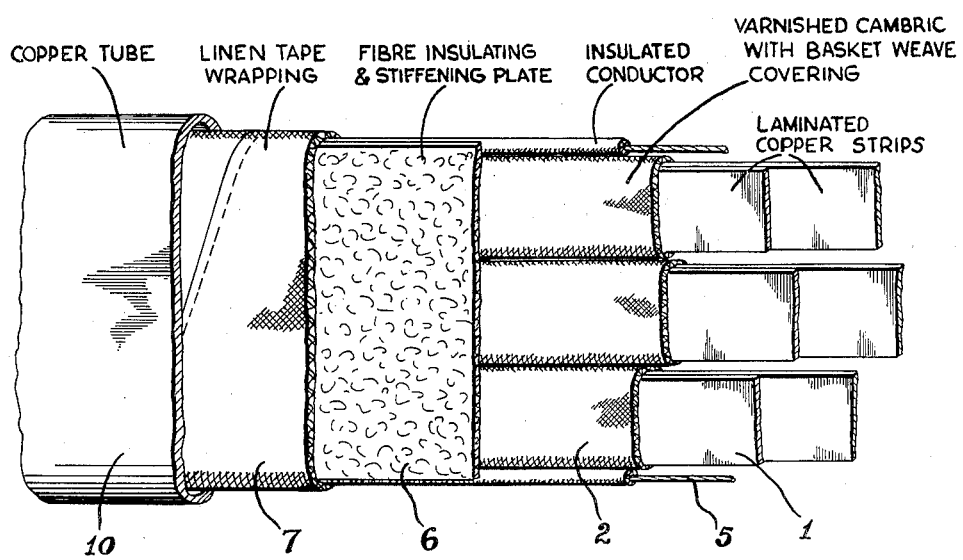
Figure 2:
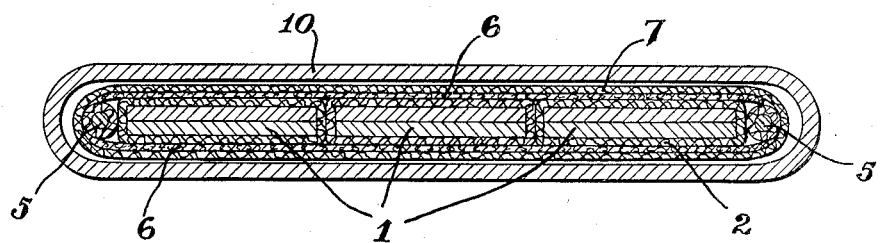

Other objects and advantages will be apparent to those skilled in the art, and will be made evident from the following description, taken in conjunction with the accompanying drawing, in which:

Figure 1 is a view in perspective of a portion of a flat cable constructed in accordance with this invention, the various wrappings being cut back in steps to illustrate the construction; and Figure 2 is a cross-section through the cable.

Referring to the drawing, the cable has embedded therein three main power conductors 1 for supplying current to a polyphase motor. These conductors, preferably rectangular in cross-section, are relatively thin and consist of a plurality of superposed layers of thin copper strips, forming a laminated structure having a relatively high degree of flexibility as compared to a solid strip. By reason of the laminated structure, a conductor of any desired capacity may be constructed by using the required number of standard sized copper strips. For purpose of illustration, each conductor is shown as comprising two strips. The conductors are separately wrapped with insulating material 2, preferably varnished cambric with an outer layer of basket weave to prevent unraveling of the cambric when severed. The three insulated conductors are disposed in side-by-side relation, with their wide edges lying in common planes.

In addition to the three power conductors, two additional conductors 5, 5 are embedded in the cable; these conductors are intended to be connected to motor control devices and consequently are of considerably lower capacity than the power conductors and hence are smaller. The conductors 5 are preferably of the usual circular cross-section and are wrapped in the same type of insulation as that used on the power conductors. One conductor 5 is disposed at each end of the row of power conductors, being of substantially the same thickness as the latter. In order to retain the five conductors in assembly relation in a flat series, a fibre stiffening and insulating strip 6 is placed on each side of the series of conductors, and the assembly is then wrapped with a resilient, absorbent fabric 7, preferably linen tape, thus forming a more or less rigid assembly.

The fabric wrapping serves to bind the conductors and fibre stiffening plates together as a unit, capable of being handled without danger of the conductors getting out of alignment. The wrapping also functions as a covering over the stiffening plates, protecting them against abrasion from the metallic sheath into which the assembly is inserted, as described hereinafter.

The assembly is then inserted endwise into a metallic sheath, herein a flat copper tube 10, shaped to conform to the shape of the assembly and of a size to provide sufficient clearance for insertion of the assembly. The contemplated uses of the cable are such that relatively short lengths, ranging from 10 to 25 feet, are adequate. Such lengths can be conveniently assembled in this manner.

In submersible motorpump units, in connection with which the above described cable is particularly useful, it is customary to fill the motor casing with a dielectric fluid and to subject this fluid to the hydrostatic pressure of the well liquid. It is possible, with the cable of the present invention, to place the interior of the cable in communication with the dielectric fluid in the motor casing and fill the spaces in the cable with such fluid. The clearance between the wrapping 7 and the tube 10 provides space for the dielectric fluid, and the wrapping itself is absorbent and is readily soaked, serving as a wick. In this manner, the external pressure to which the cable is exposed will be balanced thus permitting the use of a relatively small wall thickness for the copper tubing. As a result of this construction, a cable of minimum thickness is produced, and one which has sufficient flexibility to be easily shaped to the contour of the pump and motor.

From the foregoing, it will be seen that a relatively thin, flat cable is provided, with a conducting capacity equal to that of a round cable of much greater thickness. Such a cable may be constructed by a novel method involving only a few simple steps and requiring no special equipment.

It will also be apparent that with the cable described, external pressures may be balanced internally to prevent failure of the copper tube and the leakage of external liquid into the cable and the consequent short-circuiting of the leads.

I claim:

The method of constructing a flat multiple-conductor cable, which comprises the steps of: assembling at least three individually insulated relatively thin, flat strip conductors in side-by-side relation with their flat sides in alignment, applying sheets of stiffening material to opposite sides of said conductors to prevent transverse buckling of said conductors; wrapping a continuous strip of fabric binding material spirally about said conductors and stiffening sheets to thereby secure the latter in assembled relation and permit handling thereof without disturbing the relative positions of said conductors and stiffening sheets; and pushing the wrapped assembly endwise into a tubular metallic sheath.

VAINO A. HOOVER.